United States Patent

Takata et al.

Patent Number: 5,403,545
Date of Patent: Apr. 4, 1995

[54] BEARING STEEL

[75] Inventors: Yatsuka Takata, Chita; Akira Muroga, Nagoya; Yoshihiro Wakikado; Takao Ooki, both of Chita; Masao Goto, Kashiwari; Hazime Tazumi; Teruo Hoshino, both of Yao; Masayuki Kitamura, Toyonaka; Toshihiro Kawaguchi, Kashiwara; Yoshitaka Natsume, Kariya; Akihiro Mizutani, Nagoya, all of Japan

[73] Assignees: Aichi Steel Works, Ltd.; Koyo Seiko K.K.; Nippondenso Co., Ltd., Japan

[21] Appl. No.: 990,802

[22] Filed: Dec. 14, 1992

Related U.S. Application Data

[63] Continuation of Ser. No. 704,167, May 22, 1991, abandoned.

[30] Foreign Application Priority Data

| May 23, 1990 | [JP] | Japan | 2-133489 |
| Mar. 5, 1991 | [JP] | Japan | 3-065644 |
| Mar. 5, 1991 | [JP] | Japan | 3-065645 |

[51] Int. Cl.⁶ ............... C22C 38/46; C22C 38/60
[52] U.S. Cl. ............... 420/112; 420/83; 420/84
[58] Field of Search ........... 420/104, 83, 112, 84; 148/906

[56] References Cited

U.S. PATENT DOCUMENTS

| 3,929,523 | 12/1975 | Kinoshi et al. | |
| 3,945,821 | 3/1976 | Stroup. | |
| 4,224,060 | 9/1980 | de Souza et al. | 420/104 |
| 5,013,525 | 5/1991 | Hamada et al. | 420/104 |

FOREIGN PATENT DOCUMENTS

| 46-019425 | 5/1971 | Japan. | |
| 51-006116 | 1/1976 | Japan. | |
| 61-272349 | 12/1986 | Japan. | |
| 63-062847 | 3/1988 | Japan. | |
| 63-303221 | 12/1988 | Japan. | |
| 2-093041 | 4/1990 | Japan. | |
| 2-156045 | 6/1990 | Japan. | |
| 1408218 | 3/1975 | United Kingdom. | |
| 2155951 | 10/1985 | United Kingdom. | |
| 2200369 | 8/1988 | United Kingdom. | |
| 120526 | 6/1959 | U.S.S.R. | |
| 226858 | 9/1968 | U.S.S.R. | |
| 863705 | 9/1981 | U.S.S.R. | 420/83 |

OTHER PUBLICATIONS

Key to Steels, West Germany, 10 Edition 1974.

Primary Examiner—Deborah Yee
Attorney, Agent, or Firm—Stroock & Stroock & Lavan

[57] ABSTRACT

A bearing steel having long rolling life comprising, by weight, 0.65 to 0.90% of C, 0.15 to 0.50% of Si, 0.15 to 1.0% of Mn and 2.0 to 5.0% of Cr, and the balance of Fe. Austenite grain size can be prevented from becoming coarser to make hardening in high temperature possible by further adding one or more of 0.0090 to 0.0200% of N, 0.010 to 0.050% of Al and 0.005 to 0.500% of Nb as optional elements to the steel. Further, rolling fatigue life can be improved by further adding one or more of 0.20 to 0.50% of Ni, 0.10 to 2.00% Of Mo and 0.05 to 1.00% of V as optional elements, and machinability can be improved by further adding one or more of 0.02 to 0.05% of S, 0.005 to 0.10% of rare earth elements, 0.02 to 0.30% of Pb, 0.0005 to 0.0100% of Ca, 0.001 to 0.200% of Bi, 0.005 to 0.20% of Se and 0.005 to 0.100% of Te in the steel as optional elements.

9 Claims, 2 Drawing Sheets

BEARING STEEL

This is a continuation of application Ser. No. 07/704,167, filed May 22, 1991, for BEARING STEEL, now abandoned.

BACKGROUND OF THE INVENTION

1. Field of the Invention

The present invention relates to a bearing steel for use in ball bearings and/or roller bearings (hereinafter referred to as "rolling bearings") of engines and auxiliary equipments such as alternators driven by engines, for example, of automobiles, in particular, those used under vibration and impact load, or for use in rolling and sliding components, for example, of automobiles.

2. Prior Art

As the material for bearing rings and balls and/or rollers (hereinafter referred to as "rolling elements") in rolling bearings, high-carbon chromium bearing steels (in particular JIS SUJ2) have been used most generally and, in addition, various other materials are also used corresponding to versatile working conditions for the rolling bearings. For instance, case hardening steels (for example, SAE 5120) applied with carburizing hardening and tempering for improving the toughness are used for bearings undergoing impact loads.

SUMMARY OF THE INVENTION

For engines and auxiliary equipments such as alternators driven by the engines which are used, for example, in automobiles, reduction of the size and the weight, as well as improvement for the performance have been progressed vigorously in recent years and, accompanying therewith, the size has been reduced and the speed of rotation of the rolling bearings used has been increased. This remarkably increases vibration and impact loads exerted on the rolling bearings and elevates the temperature of the bearing, to result in a problem that peeling occurs in a short period of time in the rolling bearing made of the prior art steels described above, making it impossible for use. For instance, in alternators driven by engines for generating electric power, vibrations transmitted from driving belts interconnecting therebetween are always exerted on the bearings in addition to the impact loads caused by upward impacts from the road surface during running of the automobiles.

It is apparent that reduction of the size and the weight and the improvement for the performance of the engines or the auxiliary equipments will be sought more and more under the increasing requirement for the improvement of the fuel consumption in automobiles. Accordingly, it has been keenly demanded for the development of bearing steels capable of providing a long durability life under high speed rotation, vibration and impact loads.

For the study directed to the resolution of the foregoing subject, the present inventors have at first investigated factors that are attributable to the reduction of the durability life of the bearing caused by the high speed rotation. As a result, although the exhaustion of the life span the bearing seems to be caused by peeling, it has been found that phenomena different from those considered so far are present in the course where the peeling occurs.

Figure 1:
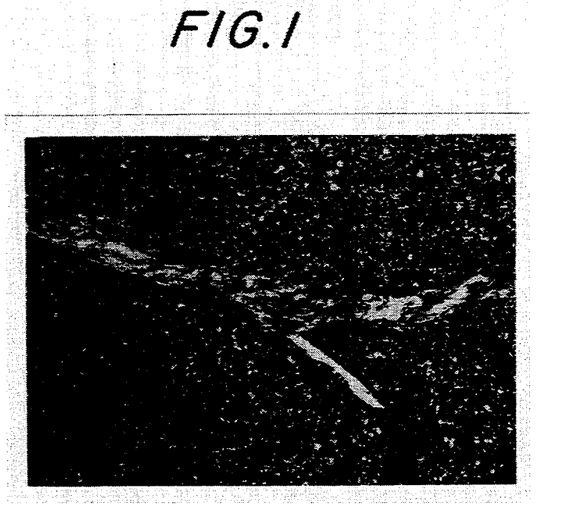
FIG. 1 is a optical micrograph showing a cross sectional microstructure positioned under a rolling surface of a bearing that causes peeling in a short period of time due to high speed rotation.

At first, when a cross sectional micro-structure was observed under the rolling surface of a bearing that suffered from peeling during high speed rotation in a short period of time, metallic structure less corrosive and appearing white (hereinafter referred to as white layers) different from a matrix (matrix phase) was formed under the rolling surface near a position where the maximum shear stress occured position. FIG. 1 shows an optical micrograph for the micro metallic structure along the cross section containing the white layers.

Then, when the hardness of the white layer portion and the matrix at the periphery thereof was measured by a micro Vickers hardness tester, it has been found that the hardness of the matrix was about HV 750, whereas the hardness of the white layer was HV 1100 to 1300 and, accordingly, the white layer portion is much harder than the matrix portion.

From the result as described above, it has been estimated that reason for the durability life of the bearing is shortened due to the high speed rotation, is that the white layers are formed in a position near the portion where the maximum shear stress occurs and that the white layer is hard and brittle and accordingly, cracks are formed in an early stage by repeating application of shear stresses, which easily develop into the matrix to cause peeling.

However, such white layers to shorten the life span of the bearing are not observed in usual durability life test for bearing and it is therefore considered that vibrations and impact loads have a great influence on the factors of reducing the durability life of the bearing due to the occurence of the white layers, a test was conducted for confirming this consideration.

A ball bearing JIS B 1512(6303) (17 mm in inner diameter, 47 mm in outer diameter) was prepared from two kinds of materials shown in Table 1, with the inner and the outer rings being made of an identical material, and then applied with a heat treatment specified in the middle column of the table so as to attain the hardness shown in the right column of the table. Then, a rotational durability life test was applied to the bearing specimens by applying loads by two static and dynamic methods as shown in Table 2. In the static load test, the bearing specimen is assembled to a durability life tester and rotated continuously under a static load. On the other hand, in a dynamic load test, a durability life tester is disposed on a vibration bed and the bearing specimen was subjected to a continuous rotation test while applying a static load to the bearing specimen and applying vibrations to the entire testing machine. The rotational durability life test was conducted twice for each of the materials and each of the test conditions and the results are shown in Table 3.

TABLE 1

| Kind of specimen | Material | Heat treatment | Hardness(HRC) |
|---|---|---|---|
| TA | JIS:SUJ2 | Hardening - tempering | 61~62 |
| TB | SAE:5120 | Carburizing - hardening, tempering (effective hardening depth = 0.7~1.0 mm) | Surface hardness 61~62 |

TABLE 2

| Test Method | Static load test | Dynamic load test |
|---|---|---|
| Load ratio = Bearing load (static load) / Rated dynamic load | 0.22 | |
| Rotational speed (inner ring rotation) | 18,000 rpm | |
| Lubrication | Grease sealed | |
| Calculated life (not considering vibration) | 87 hr | |
| Acceleration of vibration | 0 (not added) | 10 G (axial, 220 Hz) |

TABLE 3

| Kind of specimen | Static load test | | | Dynamic load test | | |
|---|---|---|---|---|---|---|
| | specimen No. | rolling fatigue life (hr.) | Content of life | specimen No. | rolling fatigue life (hr) | Content of life |
| TA | TA 1 | 1000 | With interruption, no abnormality | TA 3 | 43 | Peeling, with white layer |
| | TA 2 | 1000 | With interruption, no abnormality | TA 4 | 61 | Peeling, with white layer |
| TB | TB 1 | 1000 | With interruption, no abnormality | TB 3 | 189 | Peeling, with white layer |
| | TB 2 | 1000 | With interruption, no abnormality | TB 4 | 202 | Peeling, with white layer |

As a result of the test, it has been found that peeling occurred in none of the bearing specimens even after 1000 hours of continuous rotation in the static load test, giving no problem for the durability life time. However, in a dynamic load test in which vibrations are superposed on the static load test, it has been found that peeling occurred only in 43 hours and 61 hours in the bearings made of steel provided by JIS SUJ2 and in 189 hours and 202 hours in the bearings made of SAE 5120 case hardening steel provided by SAE 5120 to remarkably reduce the durability life of the bearing.

When the microstructure of the metal positioned under the rolling surface of the specimen showing reduced durability life in the dynamic load test was observed, it has been recognised that white layers like those in FIG. 1 are come into existence.

Figure 2:
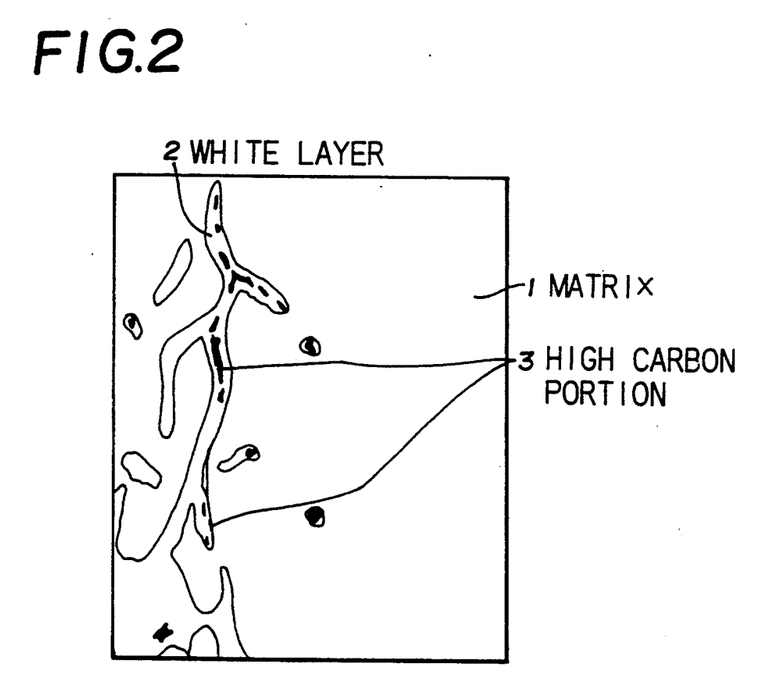
FIG. 2 is a schematic view showing the result of EPMA analysis for the distribution of the carbon concentration in the white layer and the matrix.

When the distribution of the carbon (C) concentration in the microstructure in which the white layer is come into existence was analyzed by EPMA (electron probe micro analyzer), it has been found that the carbon (C) concentration was higher in the white layer portion than in the matrix portion. FIG. 2 schematically shows the result of the investigation by EPMA for the carbon concentration distribution in the white layer and in the peripheral portion thereof, in which it is clearly shown that the carbon concentration is higher in the white layer 2 than in the matrix 1. It has been further confirmed that within the white layer 2, a portion showing higher carbon concentration (high carbon portion) 3 than that in the white layer 2 is present.

It is considered that the reason why the white layer portion has higher carbon concentration, because the carbon atoms are diffused and condensed in that portion. Since the diffusion of the carbon atom is induced by stresses, it is considered that loading of repeating stresses on the bearing specimen due to vibration promotes the stresses-induced diffusion of the carbon atoms, to promote the condensation of carbon into white layer portion. Further, micro strains are accumulated in the microstructure positioned under the rolling surface due to the loading of the repeating stresses and the carbon atoms are bonded there due to the accumulated strains. That is, the carbon atoms are diffused and bonded in the metallic structure located at a position under the rolling surface where the maximum shear stress occures by the repeating impact stresses, consequently, the white layers having extremely high hardness and less corrosive come into existence. Then, by the application of the repeating impact loads, cracks are formed from the highly hard and brittle white layers, which are propagated and developed into the matrix to cause early peeling.

A primary object of the present invention is to provide a bearing steel having a long durability life even in a case where it is used under vibrations and impact loads due to high speed rotation.

In view of the foregoing object and with consideration that inhibition for the formation of the white layers is necessary for improving the durability life of the bearings, the present inventors have aimed at the suppression of carbon diffusion and improvement of the matrix strength. Then, as a result of an investigation for a relationship between the concentration of carbon and other alloying elements and the diffusion rate of carbon, it has been found that lowering of the carbon content and increase of the chromium content are effective means for retarding the diffusion rate of carbon. Further, an alloy designing has been made also for alloy ingredients with a consideration of providing a sufficient mechanical strength to use as the bearing and, further, minimizing carbides or non-metallic inclusions which are harmful to the rolling bearing steel as low as possible. Accordingly, the present invention is directed to a bearing steel comprising, by weight, 0.65 to 0.90% of C, 0.15 to 0.50% of Si, 0.15 to 1.00% of Mn, 2.00 to 5.00% of Cr, and optionally, a member or members selected from the group consisting of 0.20 to 0.50% of Ni, 0.1 to 2.0% of Mo and 0.05 to 1.00% of V, the remainder being Fe and inevitable impurities.

Since the bearing steel described above has a relatively high Cr content, it is necessary to increase the quench hardening temperature higher than that for the usual bearing steels (JIS SUJ2) for attaining excellent mechanical property. Further, while bearing steels have been used generally as materials for rolling bearing units so far, they have been used also for automobile parts such as rolling or sliding components such as CVJ (constant velocity joint) and face cam along with the improvement for the technique in the automobile parts in recent years. Such automobile parts include those having a greater size than that of the rolling bearings, which are sometimes required longer heating time necessary for the quench hardening.

However, if the quench hardening temperature is elevated or the time necessary for quench hardening is prolonged, there may be a risk that the austenite crystal grains become coarser to reduce the toughness after the heat treatment. This may lead to the reduction of the contact rolling fatigue life and offset the advantageous effect attained by the steel according to the present invention which is made as a result of the study described above.

It is, accordingly, another object of the present invention to provide a bearing steel capable of attaining the characteristics of the bearing steel regarding the prior statement as much as possible without making the crystal grains coarser even under an increased quench hardening temperature.

The bearing steel described above comprises, by weight, 0.65 to 0.90% of C, 0.15 to 0.50% of Si, 0.15 to 1.00% of Mn, 2.0 to 5.0% of Cr and 0.0090 to 0.0200% of N, and a member or members selected from the group consisting of 0.010 to 0.050% of Al and 0.005 to 0.50% of Nb the remainder being Fe and inevitable impurities. One or more of 0.20 to 0.50% of Ni, 0.10 to 2.00% of Mo and 0.05 to 1.00% of V may further be added as optional element or elements.

Further, in course of manufacturing a rolling bearing from the bearing steel as the material, it is always necessary to cut the steel material in the stage of working into an intermediate shape or final shape (ball, roller or race). Further, the cutting process is also applied in course of manufacturing rolling or sliding components for automobiles such as CVJ (constant velocity joint) and face cam. Since automobile parts have to be generally mass-produced at a reduced cost, machinability of the material is an important factor for the quality.

In course of cutting steel materials, annealing is usually applied previously to reduce the hardness. However, since the bearing steel has high carbon content, excellent machinability can not be obtained even after applying a sufficient annealing, which result in a problem of worsening the production efficiency of bearings or parts in the cutting step. In particular, since the above-identified bearing steel in accordance with the present invention has a relatively high Cr content, the hardness after annealing is somewhat higher and it is desired to improve the machinability.

Then, a further object of the present invention is to provide a bearing steel capable of improving the efficiency for the cutting step, which would otherwise constitute a barrier in the bearing manufacturing step without offsetting the long durability life of the bearing steel. The bearing steel as described above comprises, by weight, 0.65 to 0.90% of C, 0.15 to 0.50% of Si, 0.15 to 1.00% of Mn, 2.0 to 5.0% of Cr and a member or members selected from the group consisting of 0.020 to 0.050 of S, 0.005 to 0.10% of rare earth element, 0.02 to 0.30% of Pb, 0.0005 to 0.0100% of Ca, 0.001 to 0.200% of Bi, 0.005 to 0.20% of Se and 0.005 to 0.100% of Te, the remainder being Fe and inevitable impurities. Further, a member or members selected from the group consisting of 0.20 to 0.50% of Ni, 0.10 to 2.00% of Mo and 0.05 to 1.00% of V may be incorporated as optional element or elements.

BRIEF DESCRIPTION OF THE DRAWINGS

Various other objects, features and attendant advantages of the present invention will be more fully appreciated as the same becomes better understood from the following detailed description when considered in connection with the accompanying drawings wherein.

DETAILED DESCRIPTION OF THE PREFERRED EMBODIMENTS

The present invention relates to a bearing steel comprising, by weight, 0.65 to 0.90% of C, 0.15 to 0.50% of Si, 0.15 to 1.0% of Mn and 2.0 to 5.0% of Cr, the remainder being of Fe and inevitable impurities.

The bearing steel according to the present invention can dissolve the reduction of the durability life of the bearing used under vibrations and impact loads due to high speed rotation and is practically excellent in view of the machinability as well.

The properties of the chemical components of the steel according to the present invention and the reasons for the limitations to the contents of the components will now be explained below.

C: 0.65 to 0.90%

In a rolling bearing, since a rolling element and a bearing ring (race) make a line-to-line contact (roller bearing) or point-to-point contact (ball bearing) to each other, pressure of contact is extremely high. Accordingly, it is most important for the property of the rolling bearing steel that it has such a high hardness as not causing plastic deformation and ensures smooth movement of the bearing at the contacting portions. Further, the hardness is also required to be high in view of the abrasion resistance. Then, it is necessary that the carbon content is more than 0.65% with the reasons as described above. However, if it is contained by more than 0.90%, the metallic structure is caused to change during use since the carbon diffusion rate is increased and carbides become huge to cause stress concentration and this leads to the reduction of the rolling contact fatigue life as described previously. In addition, this increase in the amount of the carbides to degrades the machinability. Accordingly, the upper limit is defined as 0.90%.

Si: 0.15 to 0.50%

Silicon is used as a deoxidizer upon steel refining. If deoxidization of steel is insufficient, oxide inclusions are increased in the steels, which also constitute a stress concentration source to promote the change of the metallic structure during use. For the deoxidization, at least 0.15% of silicon content is necessary. On the contrary, if it is incorporated by more than 0.50%, the amount of residual austenite after quench hardening is increased, which reduces the hardness after hardening and the rolling contact fatigue life. Further, since the lowering of the hardness after annealing is not sufficient, the machinability is degraded.

Mn: 0.15 to 1.00%

Manganese is an element used upon refining as a deoxidizer as well as silicon. Further, it has a great effect for improving the hardenability and it is an useful element for applying complete hardening in a relatively larger parts. For attaining these effects, at least 0.15% of manganese has to be incorporated. However, if is exceeds 1.00%, the amount of the retained austenite after hardening is increased, which reduces the hardness obtained by quench hardening and the rolling contact fatigue life.

Cr: 2.00 to 5.00%

Chromium is an important element for improving the hardenability and it restrains the change of the microstructure due to the carbon diffusion, to contribute to the improvement of the durability life. For attaining such an effect, at least 2.0% of chromium has to be contained. On the other hand, if the content exceeds 5.0%, the effect is saturated and, on the contrary, workability is degraded in the steps such as rolling, forging and cutting and the material cost is increased as well.

Ni: 0.20 to 0.50%

Nickel has an effect of reinforcing the matrix to improve the toughness thereby improving the rolling contact fatigue life. For ensuring such an effect, it has to be contained by more than 0.20%. However, if it is contained by more than 0.50%, the amount of the retained austenite is increased to reduce the hardness obtained by quench hardening, which rather lowers the rolling contact fatigue life. In addition, since the nickel is an expensive element, excess addition may result in wasteful and increase in the material cost.

Mo: 0.1 to 2.0%

Molybdenum reinforces the matrix and restrains the carbon diffusion to thereby prevent the reduction of the rolling contact fatigue life due to the change of the microstructure. In order to attain such an effect, molybdenum has to be contained by more than 0.1%. However, if it is contained by more than 2.0%, such an effect is saturated and the workability of the steel is degraded and the material cost is increased wastefully.

V: 0.05 to 1.00%

Vanadium forms fine and stable carbides to thereby suppress the carbon diffusion and prevent the change of microstructure during use. That is, this is an element effective for improving the rolling contact fatigue life and such an effect can be obtained by incorporating vanadium by more than 0.05%. However, if it is contained by more than 1.0%, such an effect is saturated, the rolling and forging properties as well as the machinability of the steel are lowered and the material cost is increased wastefully.

N: 0.0090 to 0.0200%

As described subsequently, nitrogen chemically bonds with niobium and aluminum to form nitrides thereby plays a roll for preventing the austenite crystal grains from becoming coarser. The minimum content of nitrogen corresponding to the contents of niobium and aluminum described later is 0.0090%. However, if it exceeds 0.0200%, the effect is saturated and steel manufacture becomes difficult.

Al: 0.010 to 0.050%

Aluminum forms fine nitride (AlN) in the steel which are finely dispersed in the steel to prevent austenite crystal grains from becoming coarser during heating for quench hardening. For this purpose, at least 0.010% of the content of aluminum is necessary. On the contrary, if it is contained by more than 0.050%, alumina ($Al_2O_3$) as non-metallic inclusion is increased which reduces the rolling contact fatigue life.

Nb: 0.005 to 0.50%

Niobium, like aluminum forms fine carbonitrides in the steel which are finely dispersed in the steel to prevent the growth of the austenite crystal grains during heating for quench hardening. For attaining this effect sufficiently, at least 0.005% of the content is necessary. However, if it is contained by more than 0.50%, the effect is saturated to result in the reduction of the workability of the steel and the wasteful increase in the material cost.

S: 0.020 to 0.050%

Sulfur is dispersed as MnS in the steel. Since MnS is much softer material than steel, shear stress at a blade tip is reduced by the internal notch effect upon cutting. Further, it reduces the cutting force also by the lubricating effect at the cutting portion to thereby improve the machinability of the steel. For effectively attaining such an effect for the improvement of the roachinability, sulfur has to be contained at least by 0.020%. However, if it is contained by more than 0.050%, sulfur chemically bonds with bismuth to hinder the hot workability. Further, the amount of MnS as the non-metal inclusion becomes excessive to lower the rolling contact fatigue life of the rolling bearing.

REM: 0.005 to 0.10%

The rare earth elements also improve the machinability and, for attaining such an effect, they have to be contained by at least 0.005%. However, if they are contained by more than 0.10%, the effect for improving the machinability is saturated and most of them are wastefully remained not melted in the matrix. This also lowers the rolling contact fatigue life by the reason different from the change of the metallic structure described above.

Pb: 0.02 to 0.30%

Lead is not solid-solubilized into the steel but finely dispersed alone or together with sulfides in the steel. Since lead is also much softer than the steel, it can improve the machinability of the steel by the same effect as that of MnS. For effectively attaining such an effect of lead for improving the machinability, it has to be contained a least by 0.02%. However, if it is contained by more than 0.30%, the hot workability is reduced and the rolling contact fatigue life of the bearing steel is lowered.

Ca: 0.0005 to 0.0100%

Calcium has an effect of suppressing the diffusion abrasion of deposits, so called belark adhered on the cutting surface of tools, by which the machinability of the steel can be improved in the sense of extending the tool life. For attaining such an effect, Ca has to be contained by at least 0.0005%. However, even if it is contained by more than 0.0100%, such an effect is saturated, the material cost is wastefully increased and also the rolling contact fatigue life is reduced.

Bi: 0.001 to 0.200%

Bismuth is dispersed by itself into the steel to improve the machinability of the steel like lead. The minimum content necessary for attaining this effect is 0.001%. However, if it is contained by more than 0.200%, the hot workability and the contact rolling fatigue life are deteriorated like that in the case of lead.

Se: 0.005 to 0.20%, Te: 0.005 to 0.10%

Selenium and tellurium are elements belonging to the same group as sulfur and they improve the machinability of the steel due to the effect similar to that of sulfur. Further, they also have an effect of making the shape of MnS particle nearly spherical, thereby eliminating the factor for reducing the rolling contact fatigue life, that is, reducing formation of a crack from the extended top end of MnS particle if it is formed in an elongated shape. They contribute to the improvement of the contact rolling fatigue life also on this view point. Such effects can be obtain only when both of the selenium and tellurium are contained each by more than 0.005%, respectively. However, the effect is saturated, to wastefully increase the material cost and lower the contact rolling fatigue life if the selenium is contained by more than 0.20% and the tellerium is contained by more than 0.10%, respectively.

EXAMPLE 1

Table 4 shows the chemical composition for the steels according to the present invention, comparative steels and conventional steels. In Table 4, steels shown by Nos. A1–A9 are steels according to the present invention; steels shown by Nos. B1–B7 are comparative steels in which one of the ingredient elements is out of range as defined in the present invention, steels shown by Nos. C1 and C2 are conventional steels in which Nos. C1 is an example of steels defined in JIS: SUJ2, while No. C2 is an example of steels defined in SAE: 5120.

A dynamic load test was applied for the steels under the conditions shown in Table 2, i.e., after application of ordinary quench hardening and tempering to control the hardness of the steel to be HRC 61–62 for the steels Nos. A1–A9 according to the present invention, the comparative steels Nos. B1–B7 and the conventional steel C1, and after application of carburizing hardening and tempering to control the surface hardness of the steel to HRC 61–62 for the conventional steel No. C2.

The test was conducted while assembling a bearing to an alternator under the conditions shown in Table 2 and the fatigue life for each of the specimens is shown in Table 5. In this table, "fatigue life" means a period of time from the beginning of the test to the occurrence of peeling.

TABLE 4

| | Chemical Composition (wt %) | | | | | |
|---|---|---|---|---|---|---|
| No. | C | Si | Mn | Ni | Cr | Mo | V |
| A1 | 0.68 | 0.15 | 0.18 | 0.09 | 2.12 | | |
| A2 | 0.86 | 0.22 | 0.49 | 0.12 | 2.15 | | |
| A3 | 0.87 | 0.27 | 0.67 | 0.17 | 4.41 | | |
| A4 | 0.69 | 0.46 | 0.95 | 0.12 | 4.71 | | |
| A5 | 0.67 | 0.46 | 0.95 | 0.48 | 4.40 | | |
| A6 | 0.75 | 0.23 | 0.35 | 0.35 | 3.54 | 1.35 | |
| A7 | 0.81 | 0.26 | 0.28 | 0.28 | 3.95 | | 0.56 |
| A8 | 0.66 | 0.25 | 0.36 | 0.47 | 4.40 | 1.02 | 0.26 |
| A9 | 0.87 | 0.16 | 0.18 | 0.12 | 2.10 | 1.93 | 0.48 |
| B1 | 0.60 | 0.15 | 0.17 | 0.09 | 2.10 | | |
| B2 | 0.78 | 0.41 | 0.94 | 0.06 | 5.41 | | |
| B3 | 0.96 | 0.26 | 0.95 | 0.07 | 4.40 | | |
| B4 | 0.72 | 0.10 | 0.18 | 0.13 | 1.85 | | |
| B5 | 0.86 | 0.55 | 0.93 | 0.07 | 4.42 | | |
| B6 | 0.85 | 0.27 | 1.16 | 0.08 | 4.40 | | |
| B7 | 0.63 | 0.35 | 0.94 | 0.06 | 1.80 | | |
| C1 | 1.01 | 0.23 | 0.41 | 0.11 | 1.44 | | |
| C2 | 0.21 | 0.24 | 0.79 | 0.09 | 0.81 | | |

TABLE 5

| No | Fatigue life (hr) | No | Fatigue life (hr) |
|---|---|---|---|
| A1 | 1133 | B1 | 613 |
| A2 | 1019 | B2 | 1403 |
| A3 | 1247 | B3 | 909 |
| A4 | 1342 | B4 | 748 |
| A5 | 1347 | B5 | 906 |
| A6 | 1488 | B6 | 932 |
| A7 | 1471 | B7 | 744 |
| A8 | 1495 | C1 | 43, 61 |
| A9 | 1411 | C2 | 189, 202 |

As apparent from Table 5, as compared with the conventional steels Nos. C1 and C2 having fatigue life of 43 to 202 hours, the steels Nos. A1–A9 according to the present invention have longer fatigue life of 1019 to 1495 hours and their material cost is within a reasonable range and they are the steels having long fatigue life and excellent practical usefulness for use in the rolling bearings.

The comparative steels Nos. B1,B3–B7 have longer fatigue life as compared with the conventional steels Nos. C1 and C2 but are much inferior as compared with the steels according to the present invention. The comparative steel No. B2 has a fatigue life of 1403 hours which is comparable with the steels according to the present invention, but the Cr content thereof is as high as 5.41% to increase the material cost and machinability thereof is also poor.

Heretofore, the results of the tests as well as the confirmed effects of the steels according to the present invention which were used for bearing rings have been described. However, since the peeling occurs due to the contact between the bearing ring and the rolling element with each other, it will be apparent that the steels according to present invention are also effective when they are applied to the rolling elements (balls and/or rollers).

As apparent from the foregoing results, the bearing steel according to the present invention can dissolve the problem for the reduction of the durability life of the bearing when used under vibration and impact loads accompanying the high speed rotation and is reasonable in view of the material cost and the machinability and, asccordingly, has excellent practical usefulness. In particular, it can provide an extremely excellent effect for those put under high vibrations and high impact loads such as alternators.

Accordingly, the bearing steel according to the present invention can provide an excellent long durability life at a reasonable cost when it is applied, for example, to engines and auxiliary equipments driven by engines in air crafts or automobiles, in which reduction of the durability life was caused in the conventional steels along with the increasing rotational speed in recent years. Thus, the bearing steel in accordance with the present invention can further ensure high speed rotation and contribute greatly to the improvement of the performance of such equipments.

EXAMPLE 2

Table 6 shows chemical composition of steels Nos. A10–A21 according to the present invention, comparative steels Nos. B8–B10 and conventional steels Nos. C3 and C2 which were put to a rolling life test conducted in this example. The comparative steels are those in which one of the ingredients is out of the range as defined in the present invention. The conventional steel No. C3 is an example of steels defined in JIS: SUJ 2 and No. C2 is the same as steel No. C2 shown in Table 4.

For conducting a rolling life test, disk-like test specimens were at first prepared from the test steels and applied with a predetermined heat treatment. Table 7 shows the hardening temperature for the test steels other than the steel No. C2. Since the steel No. C2 is a case hardening steel, the temperature for the secondary hardening after applying carburization is shown in Table 7. Since the steels according to the present invention have a low carbon content and contain a relatively great amount of Cr, the hardening was conducted at a temperature higher by about 50° to 70° C. than that for the conventional steels Nos. C3 and C2. The situation is the same for the comparative steels. The austinite grain size number of the test steels when they were applied with the heat treatment at the hardening temperature shown in Table 7 (values for the grain size number are accorded to JIS: G0551) is shown in the middle column of Table 7 (the crystal grain size in the surface carburized portion is shown for the case hardening steel C2).

Subsequently, tempering was applied for each of the test steels including the case hardening steel No. C2 such that the surface hardness was controlled substantially to be HRC 61–62, then a dynamic load test was conducted while rolling balls under load conditions shown in Table 2. The results are shown in Table 7. "Rolling life" shown in the table means, a period of time (hr) till the occurrence of peeling at the bearing surface from the beginning of the test.

TABLE 6

| No. | Chemical Composition (wt %) | | | | | | |
|---|---|---|---|---|---|---|---|
| | C | Si | Mn | Ni | Cr | Mo | V |
| A10 | 0.67 | 0.25 | 0.45 | 0.05 | 3.51 | 0.01 | 0.01 |
| A11 | 0.77 | 0.19 | 0.27 | 0.09 | 2.12 | 0.01 | 0.01 |
| A12 | 0.69 | 0.39 | 0.32 | 0.10 | 3.87 | 0.05 | 0.02 |
| A13 | 0.85 | 0.44 | 0.77 | 0.02 | 4.80 | 0.02 | 0.03 |
| A14 | 0.72 | 0.22 | 0.51 | 0.47 | 3.33 | 1.88 | 0.05 |
| A15 | 0.81 | 0.32 | 0.64 | 0.35 | 2.20 | 0.53 | 0.10 |
| A16 | 0.72 | 0.20 | 0.40 | 0.39 | 3.58 | 0.09 | 0.31 |
| A17 | 0.74 | 0.29 | 0.90 | 0.27 | 3.05 | 0.28 | 0.02 |
| A18 | 0.66 | 0.34 | 0.24 | 0.10 | 3.99 | 1.35 | 0.28 |
| A19 | 0.79 | 0.38 | 0.92 | 0.01 | 4.28 | 1.99 | 0.01 |
| A20 | 0.84 | 0.26 | 0.15 | 0.41 | 4.93 | 0.02 | 0.03 |
| A21 | 0.72 | 0.48 | 0.39 | 0.03 | 2.88 | 0.01 | 0.05 |
| B8 | 0.95 | 0.25 | 0.38 | 0.01 | 3.56 | 0.01 | 0.02 |
| B9 | 0.73 | 0.25 | 0.38 | 0.02 | 1.50 | 0.02 | 0.01 |
| B10 | 0.60 | 0.26 | 0.46 | 0.20 | 3.39 | 0.01 | 0.01 |
| C2 | 0.21 | 0.24 | 0.79 | 0.09 | 0.81 | | |
| C3 | 1.00 | 0.25 | 0.39 | 0.01 | 1.49 | 0.01 | |

| No. | Chemical Composition (wt %) | | |
|---|---|---|---|
| | Nb | Al | N |
| A10 | 0.010 | 0.015 | 0.0153 |
| A11 | 0.100 | 0.031 | 0.0060 |
| A12 | | 0.033 | 0.0170 |
| A13 | | 0.035 | 0.0120 |
| A14 | 0.030 | 0.027 | 0.0133 |
| A15 | | 0.042 | 0.0102 |
| A16 | | 0.043 | 0.0090 |
| A17 | 0.011 | 0.029 | 0.0117 |
| A18 | 0.018 | 0.033 | 0.0141 |
| A19 | | 0.048 | 0.0109 |
| A20 | | 0.030 | 0.0078 |
| A21 | 0.022 | 0.037 | 0.0154 |
| B8 | | 0.025 | 0.0150 |
| B9 | | 0.030 | 0.0102 |
| B10 | | 0.023 | 0.0170 |
| C2 | | 0.030 | 0.0150 |
| C3 | | 0.029 | 0.0090 |

TABLE 7

| | Heat treatment | Property | |
|---|---|---|---|
| No. | Hardening temperature (°C.) | Austenite grain size number | rolling life (hr) |
| A10 | 900 | 11.2 | 1303 |
| A11 | 900 | 11.5 | 1127 |
| A12 | 900 | 10.8 | 1379 |
| A13 | 920 | 11.1 | 1425 |
| A14 | 920 | 10.3 | 1487 |
| A15 | 920 | 10.0 | 1461 |
| A16 | 920 | 10.0 | 1400 |
| A17 | 900 | 11.7 | 1389 |
| A18 | 900 | 11.1 | 1413 |
| A19 | 920 | 10.2 | 1388 |
| A20 | 920 | 10.9 | 1391 |
| A21 | 920 | 11.0 | 1383 |
| B8 | 900 | 10.8 | 604 |
| B9 | 900 | 10.1 | 822 |
| B10 | 920 | 6.8 | 850 |
| C2 | 850* | 8.9 | 189, 202 |
| C3 | 850 | 8.7 | 43, 61 |

*secondary hardening temperature

Referring at first to the crystal grain size in Table 7, the crystal grain size in each of the steels Nos. A10–A21 according to the present invention is equal to or finer (the most fine grain size is 11.7, the most coarse grain size is 10.0 which is finer than that of the conventional steels), than that of the conventional steels Nos. C3 (JIS: SUJ2) and C2 (SAE 5120), although they were applied with hardening from a temperature higher than that for the conventional steels.

From the result of the dynamic load test shown in Table 7, improved rolling life of more than 1100 hr can be attained in any of the steels Nos. A10–A21 according to the present invention. On the contrary, the rolling life of the comparative steels Nos. B8–B10 is only about 850 hours for the longest and it is extremely short in the conventional steels as low as about from several tens to 200 hours.

As has been described above, in the steels according to the present invention, since the grain coarsening can be minimized, it is possible to apply quench hardening from such a temperature that can utilize the effect of the additive element to the maximum extent for improving the rolling life. As a result, all of the steels Nos. A10–A21 according to the present invention have a sufficient rolling life under the dynamic load, respectively as shown in Table 7.

In this example, the rolling life was measured for the test steels when they were applied to the bearing rings, but it will be apparent in view of the peeling mechanism that the improved life can be obtained also in the case of using the steels according to the present invention to rolling elements (balls and/or rollers).

As apparent from the foregoing results, the bearing steel according to the present invention can provide a long durability life, in particular, under severe conditions in which vibrations and impact loads are applied. Accordingly, the bearing steel can be used as a material most suitable to bearings used under high speed rotation or bearings for engines or auxiliary equipments driven by engines such as in automobiles or air crafts inevitably exerted with vibrations and impact loads. Furthermore, in the heat treatment for manufacturing such bearings, since quench hardening can be applied at a sufficiently elevated temperature or within an increased period of time without apprehension of the grain coarsening, this can contribute to the simplification of production steps and stable maintenance for the product quality.

EXAMPLE 3

Table 8 shows chemical composition of the steels Nos. A22–A34 according to the present invention, comparative steels Nos. B11–B14 and conventional steels Nos. C2 and C3 used for a cutting test. In the comparative steels, one of the ingredients is out of the range as defined in the present invention. Nos. C2 and C3 are conventional steels which are the same as the conventional steels shown in Table 6.

For examining the machinability of each of the test steels, heat treatment for spheroidizing was applied to a rolled bar obtained from each of the test steels and subsequently cutting test was conducted under the following conditions.

Tool: SKH4
Biting depth: 1 mm
Feed rate: 0.2 mm/rev
Cutting rate: 50 m/min
Cutting oil: none The tool life was defined as a time at which VB=0.3 mm. The results for the cutting test are shown in the left column of Table 9. As can be seen from the results, all of the steels Nos. A22–A34 according to the present invention show longer tool life than that of the conventional steels Nos. C2 and C3.

Next, for conducting a rolling life test, a predetermined heat treatment was applied so as to set the surface hardness of the test steels is to be HRC 61 to 62. Then, a rolling test piece was produced and a dynamic load test was conducted on the test piece while rolling balls under the loading conditions shown in Table 2. The results are shown in Table 9. In the table, "rolling life" means a period of time (hr) till te occurrence of peeling at the bearing surface from the beginning of the test.

TABLE 8

| No. | C | Si | Mn | Ni | Cr | Mo | V |
|---|---|---|---|---|---|---|---|
| A22 | 0.69 | 0.25 | 0.40 | 0.02 | 2.31 | 0.01 | 0.02 |
| A23 | 0.73 | 0.33 | 0.85 | 0.01 | 3.50 | 0.02 | 0.02 |
| A24 | 0.88 | 0.26 | 0.54 | 0.03 | 3.59 | 0.01 | 0.01 |
| A25 | 0.65 | 0.17 | 1.00 | 0.01 | 4.53 | 0.01 | 0.01 |
| A26 | 0.71 | 0.44 | 0.56 | 0.01 | 3.71 | 0.02 | 0.07 |
| A27 | 0.70 | 0.28 | 0.37 | 0.03 | 4.76 | 0.43 | 0.01 |
| A28 | 0.89 | 0.31 | 0.72 | 0.25 | 2.98 | 0.02 | 0.01 |
| A29 | 0.82 | 0.24 | 0.49 | 0.38 | 3.15 | 0.01 | 0.10 |
| A30 | 0.66 | 0.26 | 0.23 | 0.41 | 4.01 | 0.91 | 0.03 |
| A31 | 0.70 | 0.38 | 0.83 | 0.01 | 3.44 | 1.05 | 0.13 |
| A32 | 0.73 | 0.42 | 0.35 | 0.21 | 3.71 | 1.31 | 0.08 |
| A33 | 0.68 | 0.19 | 0.34 | 0.37 | 2.63 | 0.12 | 0.56 |
| A34 | 0.83 | 0.48 | 0.39 | 0.44 | 4.76 | 0.25 | 0.73 |
| B11 | 0.97 | 0.27 | 0.39 | 0.39 | 3.34 | 0.02 | 0.11 |
| B12 | 0.83 | 0.61 | 0.39 | 0.44 | 4.76 | 0.25 | 0.73 |
| B13 | 0.74 | 0.33 | 0.85 | 0.01 | 3.50 | 0.24 | 0.02 |
| B14 | 0.96 | 0.26 | 0.95 | 0.07 | 3.55 | 0.01 | 0.01 |
| C2 | 0.21 | 0.24 | 0.79 | 0.09 | 0.81 | | |
| C3 | 1.00 | 0.25 | 0.39 | 0.01 | 1.49 | 0.01 | |

| No. | S | REM | Pb | Ca | Bi | Se | Te |
|---|---|---|---|---|---|---|---|
| A22 | 0.044 | | | | | | |
| A23 | 0.010 | 0.02 | | | | | |
| A24 | 0.029 | | | | | 0.02 | |
| A25 | 0.011 | | | 0.0030 | | | |
| A26 | 0.015 | | | | | | 0.01 |
| A27 | 0.010 | 0.09 | | | | | |
| A28 | 0.016 | | | | | 0.03 | |
| A29 | 0.036 | | 0.11 | | | | |
| A30 | 0.032 | | | 0.0023 | | | |
| A31 | 0.025 | | | | 0.01 | | |
| A32 | 0.047 | 0.02 | | | | 0.01 | |
| A33 | 0.009 | | | 0.0045 | 0.009 | | |
| A34 | 0.013 | 0.02 | 0.04 | | | | |
| B11 | 0.015 | | 0.12 | | | | |
| B12 | 0.023 | 0.05 | 0.04 | | | | |
| B13 | 0.030 | 0.02 | | 0.010 | | | |
| B14 | 0.017 | | | | | | |
| C2 | 0.018 | | | | | | |
| C3 | 0.016 | | | | | | |

TABLE 9

| | Property | |
|---|---|---|
| No. | tool life (hr) | rolling life (hr) |
| A22 | 53 | 1156 |
| A23 | 78 | 1323 |
| A24 | 77 | 1112 |
| A25 | 103 | 1421 |
| A26 | 62 | 1382 |
| A27 | 99 | 1433 |
| A28 | 130 | 1138 |
| A29 | 146 | 1301 |
| A30 | 121 | 1469 |
| A31 | 137 | 1473 |
| A32 | 122 | 1489 |
| A33 | 154 | 1229 |
| A34 | 150 | 1231 |

TABLE 9-continued

| | Property | |
|---|---|---|
| No. | tool life (hr) | rolling life (hr) |
| B11 | 131 | 913 |
| B12 | 179 | 821 |
| B13 | 184 | 723 |
| B14 | 40 | 909 |
| C2 | | 189, 202 |
| C3 | 32, 40, 38 | 43, 61 |

As can be seen from the result of the dynamic load test shown in Table 9, a long life of more than 1100 hr can be attained in all of the steels Nos. A22–A34 according to the present invention. On the contrary, the life of the comparative steels Nos. B11–B14 is about 900 hr for the longest and the life of the conventional steels is extremely short as from several tens to 200 hours.

As described above, the steels according to the present invention are excellent in the machinability and show extremely satisfactory values for the rolling fatigue life even under dynamic load conditions. The comparative examples in which one of the ingredients is out of the range as defined in the present invention have a sufficient performance in view of the machinability, but the result of the rolling life test under the dynamic loads show that such steels are not suitable to applications in use for those portions undergoing impact shocks and vibrations as in automobiles.

In this example, the rolling life of the test steels was measured in a case of using them to the bearing rings, but it will be apparent, in view of the peeling mechanism, that the steels according to the present invention can also provide a long life when they are used as rolling elements (balls and/or rollers).

As apparent from the foregoing results, the bearing steels according to the present invention can provide a long life under severe conditions, in particular, of undergoing vibrations and impact loads. Accordingly, they can be used as a material most suitable to bearings used under high speed rotation or bearings for engines and auxiliary equipments driven by engines, for example, in automobiles or air crafts which are inevitably put under vibrations and impact shocks. In addition, since the machinability is improved, in the steels according to the present invention, the cutting speed can be increased in the cutting step upon manufacturing the bearings, etc., or in a case where the cutting fabrication is applied at an identical speed with that in the conventional case, the tool life can be increased. Therefore, the cost down can be made for the production steps in any of the cases. Further, since the steels according to the present invention are excellent also in view of the disposability of cutting dusts, troubles caused in the steps due to entangling of cutting dusts can be reduced.

What is claimed is:

1. A bearing steel consisting essentially of, by weight, 0.65 to 0.90% of C, 0.15 to 0.48% of Si, 0.15 to 1.00% of Mn, 2.0 to 5.0% of Cr, 0.05 to 1.00% V and 0.20 to 0.50% of Ni, the remainder being Fe and inevitable impurities.

2. A bearing steel consisting essentially of, by weight, 0.65 to 0.90% of C, 0.15 to 0.48% of Si, 0.15 to 1.00% of Mn, 2.0 to 5.0% of Cr, 0.05 to 1.00% of V, 0.20 to 0.50% of Ni, 0.0090 to 0.0200% of N and a member or members selected from the group consisting of 0.010 to 0.050% of Al and 0.005 to 0.50% of Nb, the remainder being Fe and inevitable impurities.

3. The bearing steel as claimed in claim 2, wherein the steel further comprises, by weight, 0.10 to 2.00% of Mo.

4. A bearing steel consisting essentially of, by weight, 0.65 to 0.90% of C, 0.15 to 0.48% of Si, 0.15 to 1.00% of Mn, 2.0 to 5.0% of Cr, 0.05 to 1.00% of V, 0.20 to 0.50% of Ni and a member or members selected from the group consisting of 0.020 to 0.050% of S, 0.005 to 0.10% of rear earth element, 0.02 to 0.30% of Pb, 0.0005 to 0.0100% of Ca, 0.001 to 0.200% of Bi, 0.005 to 0.20% of Se and 0.005 to 0.100% of Te, the remainder being Fe and inevitable impurities.

5. The bearing steel as claimed in claim 4, wherein the steel further comprises, by weight, 0.10 to 2.00% of Mo.

6. The bearing steel of claim 1, wherein the Si is present as 0.15 to 0.46%.

7. The bearing steel of claim 2, wherein the Si is present as 0.15 to 0.46%.

8. The bearing steel of claim 4, wherein the Si is present as 0.15 to 0.46%.

9. The bearing steel as claimed in claim 1, wherein the steel further comprises, by weight, 0.10 to 2.00% of Mo.

* * * * *